(12) United States Patent
Pahl

(10) Patent No.: US 8,322,656 B2
(45) Date of Patent: Dec. 4, 2012

(54) WING-FUSELAGE SECTION OF AN AIRCRAFT

(75) Inventor: Günter Pahl, Hamburg (DE)

(73) Assignee: Airbus Operations GmbH (DE)

( * ) Notice: Subject to any disclaimer, the term of this patent is extended or adjusted under 35 U.S.C. 154(b) by 314 days.

(21) Appl. No.: 12/597,250

(22) PCT Filed: Apr. 21, 2008

(86) PCT No.: PCT/EP2008/054820
§ 371 (c)(1),
(2), (4) Date: Oct. 23, 2009

(87) PCT Pub. No.: WO2008/132087
PCT Pub. Date: Nov. 6, 2008

(65) Prior Publication Data
US 2010/0133382 A1   Jun. 3, 2010

(30) Foreign Application Priority Data

Apr. 26, 2007   (DE) .......................... 10 2007 019 692

(51) Int. Cl.
*B64C 1/00*   (2006.01)
(52) U.S. Cl. ......................... 244/120; 244/119; 244/123
(58) Field of Classification Search .................. 244/119, 244/120, 123.1, 131; 249/184
See application file for complete search history.

(56) References Cited

U.S. PATENT DOCUMENTS

| | | | |
|---|---|---|---|
| 1,516,295 A | 11/1924 | Huntington | |
| 2,500,015 A | 3/1950 | Tweney et al. | |
| 2,997,262 A | 8/1961 | Kirk et al. | |
| 4,198,018 A * | 4/1980 | Brault | 244/119 |
| 5,897,078 A | 4/1999 | Burnham et al. | |
| 2004/0245394 A1* | 12/2004 | Wojciechowski | 244/123 |
| 2006/0249626 A1* | 11/2006 | Simpson et al. | 244/123.1 |
| 2007/0210211 A1* | 9/2007 | Grob | 244/119 |
| 2007/0241234 A1* | 10/2007 | Young et al. | 244/119 |
| 2007/0272798 A1* | 11/2007 | Jamgarov et al. | 244/119 |
| 2008/0210824 A1* | 9/2008 | Eberth | 244/131 |
| 2008/0237442 A1* | 10/2008 | Sarh | 249/184 |
| 2009/0250554 A1* | 10/2009 | Graeber et al. | 244/120 |

FOREIGN PATENT DOCUMENTS

| | | |
|---|---|---|
| FR | 863752 | 4/1941 |
| RU | 2154003 C2 | 8/2000 |
| RU | 2268196 C1 | 1/2006 |

OTHER PUBLICATIONS

Nui, Michael C.Y. Airframe Structural Design: Practical Design Information and Data on Aircraft Structures. Second Edition, Sep. 2006. S. 247-248. Hong Kong Conmilit Press LTD ISBN 962-7128-09-0.

* cited by examiner

*Primary Examiner* — Christopher P Ellis
*Assistant Examiner* — Medhat Badawi
(74) *Attorney, Agent, or Firm* — Lerner, David, Littenberg, Krumholz & Mentlik, LLP

(57) ABSTRACT

A wing-fuselage section of an aircraft, which wing-fuselage section comprises a wing root at which the wing of the aircraft is connected to the fuselage, a fuselage region with fuselage frame elements that extent across the longitudinal direction of the aircraft, and a wing region with spars that extend in the direction of the wingspan. According to the invention, the spars of the wing region and the fuselage frame elements of the fuselage region form part of an integral assembly that extends at least over a middle part of the wing and the fuselage region, including the wing roots.

22 Claims, 12 Drawing Sheets a)                          b)

WING-FUSELAGE SECTION OF AN AIRCRAFT

CROSS-REFERENCE TO RELATED APPLICATIONS

This application is a national phase entry under 35 U.S.C. §371 of International Application No. PCT/EP2008/054820, filed Apr. 21, 2008, published in English, which claims the benefit of the filing date of German Patent Application No. 10 2007 019 692.1-22 filed 26.04.2007, the disclosure of which application is hereby incorporated herein by reference.

FIELD OF THE INVENTION

The invention relates to a wing-fuselage section of an aircraft according to the precharacterising part of claim 1.

TECHNICAL BACKGROUND

Present-day wing-fuselage connections of aircraft comprise separate components that are joined during assembly. For example, there are wings that are attached on top of, or underneath, the fuselage by means of fittings without curtailing the space in the passenger cabin or in the cargo compartment. Structures are common in which the wing is installed in the form of a two-part, so-called centre-joint solution, or in the form of a three-part solution comprising a centre-section wing box across the cargo compartment. The installation requires connecting elements at the most highly loaded regions of an aircraft.

The various components or assemblies (wings, centre sections of the wings, fuselage), which in some cases may even be developed and produced in different plants before being joined during final assembly, result in very considerable construction and installation expenditure in order to safely master the above-mentioned problematical joining regions. For example, massive fittings are required for the connections whose tolerances are to be met at great expenditure and whose installation requires a great deal of manual work.

It is the object of the present invention to create an improved wing-fuselage section of an aircraft. In particular, a wing-fuselage section is to be created that contributes to a decrease in the overall expenditure of producing an aircraft, as well as contributing to a reduction in weight.

SUMMARY OF THE INVENTION

This object is met by a wing-fuselage section with the characteristics of claim 1.

The invention provides a wing-fuselage section of an aircraft, which wing-fuselage section comprises a wing root at which the wing of the aircraft is connected to the fuselage, a fuselage region with fuselage frame elements that extent across the longitudinal direction of the aircraft, and a wing region with spars that extend in the direction of the wingspan. The invention provides for the spars of the wing region and for the fuselage frame elements of the fuselage region to form parts of an integral assembly that extends at least over a middle part of the wing and the fuselage region, including the wing roots.

Advantageous improvements and embodiments of the wing-fuselage section according to the invention are stated in the subordinate claims.

BRIEF DESCRIPTION OF THE DRAWINGS

Below, an exemplary embodiment of the wing-fuselage section according to the invention is described with reference to the drawing.

The following are shown.

DETAILED DESCRIPTION OF PREFERRED EMBODIMENTS

Figure 1:
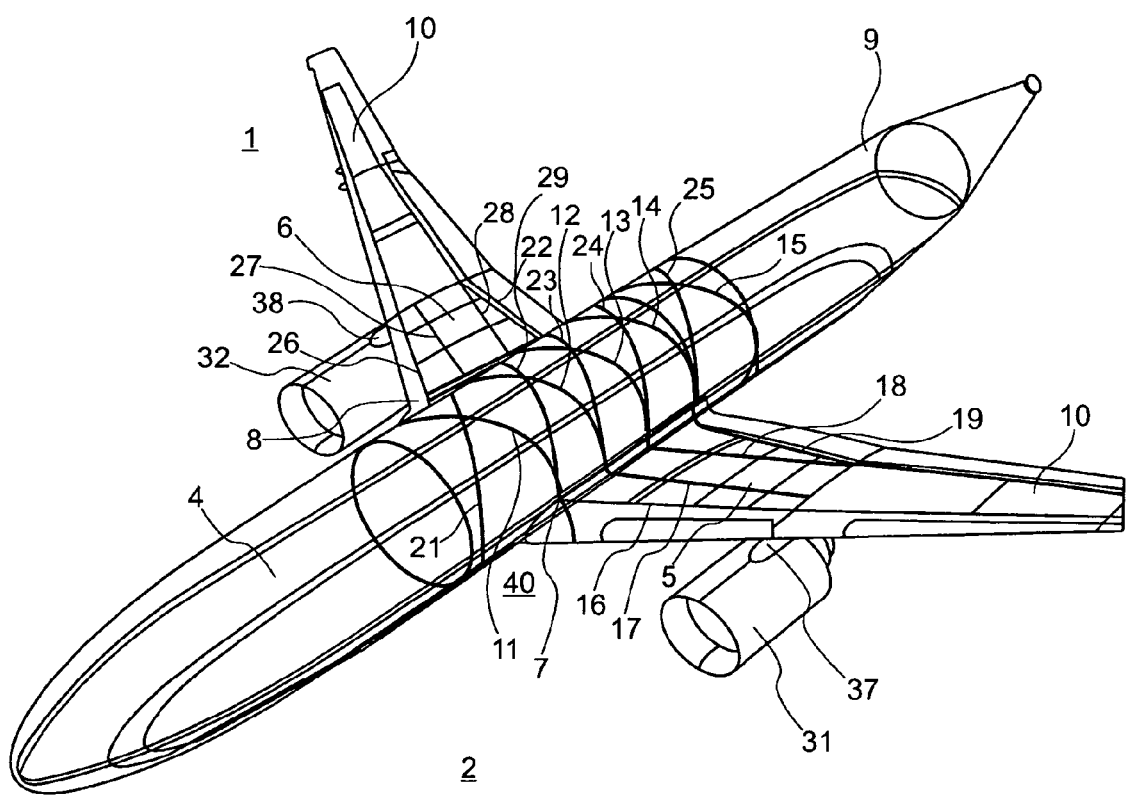
FIG. 1 a perspective view of essential components of an aircraft, in which a wing-fuselage section according to an exemplary embodiment of the invention is realised.

FIG. 1 shows a perspective view of essential components of a modern aircraft, in which a wing-fuselage section according to an exemplary embodiment of the invention is realised. The aircraft comprises a fuselage 2 and a wing 1 which by means of wing roots 7, 8 is connected to the fuselage 2. On the wing 1, engines 31, 32 are connected by means of carrier elements 37, 38 (pylons). A wing-fuselage section, overall designated by the reference character 40, comprises the wing root 7, 8 by which the wing 1 of the aircraft is connected to the fuselage 2 on both sides, as well as a fuselage region 3 with fuselage frame elements 11-15, 21-25 extending across the longitudinal direction of the aircraft, and on each side a wing region 5, 6 with spars 16-19 which extend in the direction of the wingspan, on one side, and spars 26-29 on the other side of the aircraft.

The wing-fuselage section 40 is realised in the form of an integral assembly comprising the spars 16-19 and 26-29 of the wing regions 5, 6, and the fuselage frame elements 11-15 and 21-25 of the fuselage region 3 as essential structural elements. These structural elements form an integral (i.e. included as part of the whole) inner stiffening structure of the wing-fuselage section, with a fuselage skin 90 and a wing skin 80 also being applied to said stiffening structure.

Figure 2:
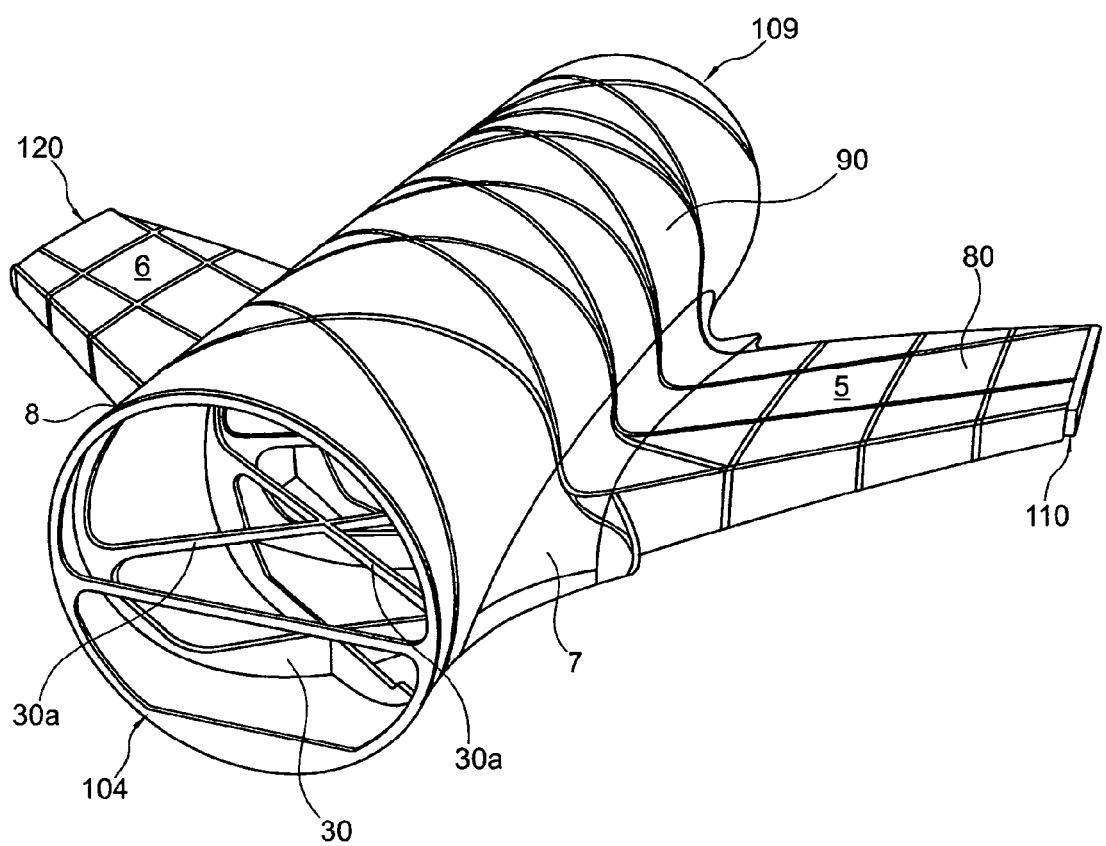
FIG. 2 a perspective view of the wing-fuselage section of the aircraft shown in FIG. 1 according to the exemplary embodiment of the invention comprising an interior stiffening structure made of spars, frame elements and beams, and an outer skin applied thereon.
Figure 3:
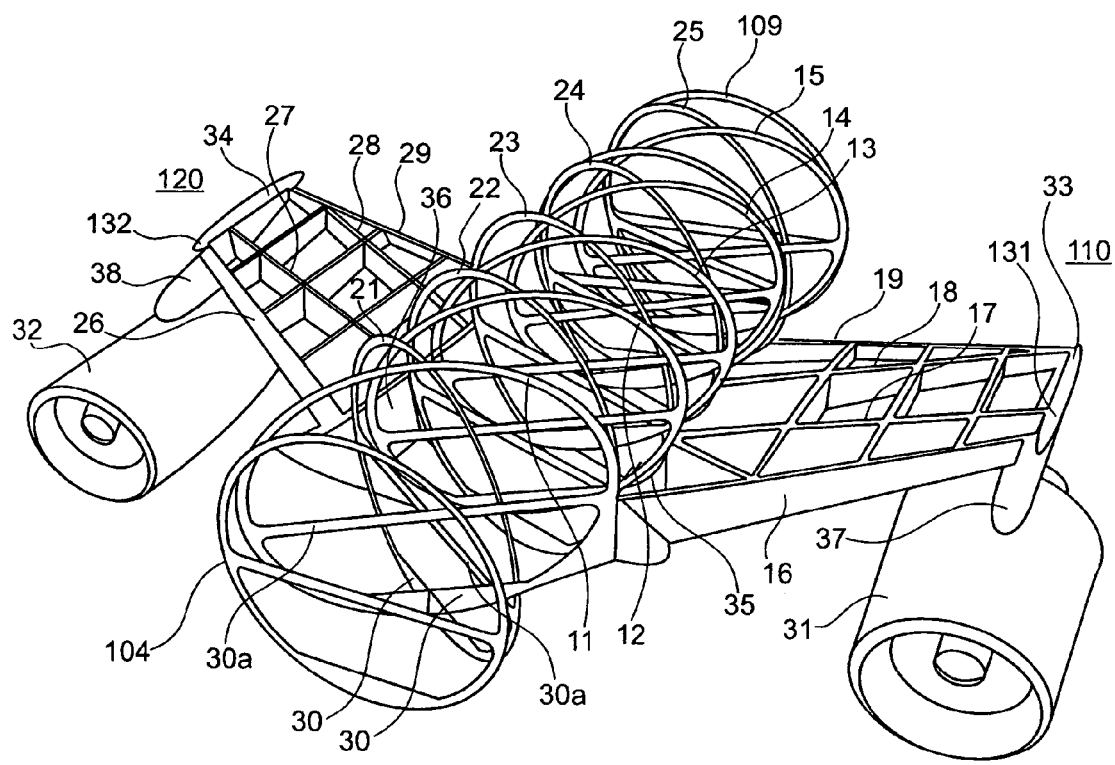
FIG. 3 a perspective view of the inner stiffening structure of the wing-fuselage section shown in FIG. 2 of the exemplary embodiment of the invention, wherein for improved clarity in addition the engines of the aircraft shown in FIG. 1 are also shown.

FIGS. 2 and 3 show the wing-fuselage section, produced in the form of said integral assembly 40, with and without the wing skin 80 and the fuselage skin 90. Together with the wing skin 80 and the fuselage skin 90, which form a further component of the integral assembly 40, the wing-fuselage section is able to absorb and distribute all the static and dynamic loads that occur in this region of the aircraft.

The integrated wing-fuselage section of the exemplary embodiment shown in FIGS. 1 to 3 extends in longitudinal direction of the aircraft from a front interface 104, that is provided for connecting a front fuselage section 4, to a rear interface 109, that is provided for connecting a rear fuselage section 9, as well as in the direction of the wingspan between two interfaces 110 or 120, which in each case are provided for connecting outboard wings 10 and 20, which form the outer parts of the wing 1, to the wing-fuselage section 40. The connections 104, 109 for the front and rear fuselage sections 4, 9 can be designed such that they provide for simple connection of said fuselage sections according to the current state of the art.

As shown in FIG. 3, in the wing region 5, 6 joining regions 131, 132 for connecting the engines 31, 32 are provided. The engines 31, 32 are connected to said joining regions with their respective carrier elements or pylons 37, 38. In the exemplary embodiment shown in FIG. 3 the joining regions 131, 132 provided for connecting the engines 31, 32, and the interfaces 110, 120 provided for connecting the outboard wings 10, 20, are formed by a shared wing connecting element 33, 34 that finishes off and delimits the integral assembly 40 in the direction of the wingspan.

Figure 7:
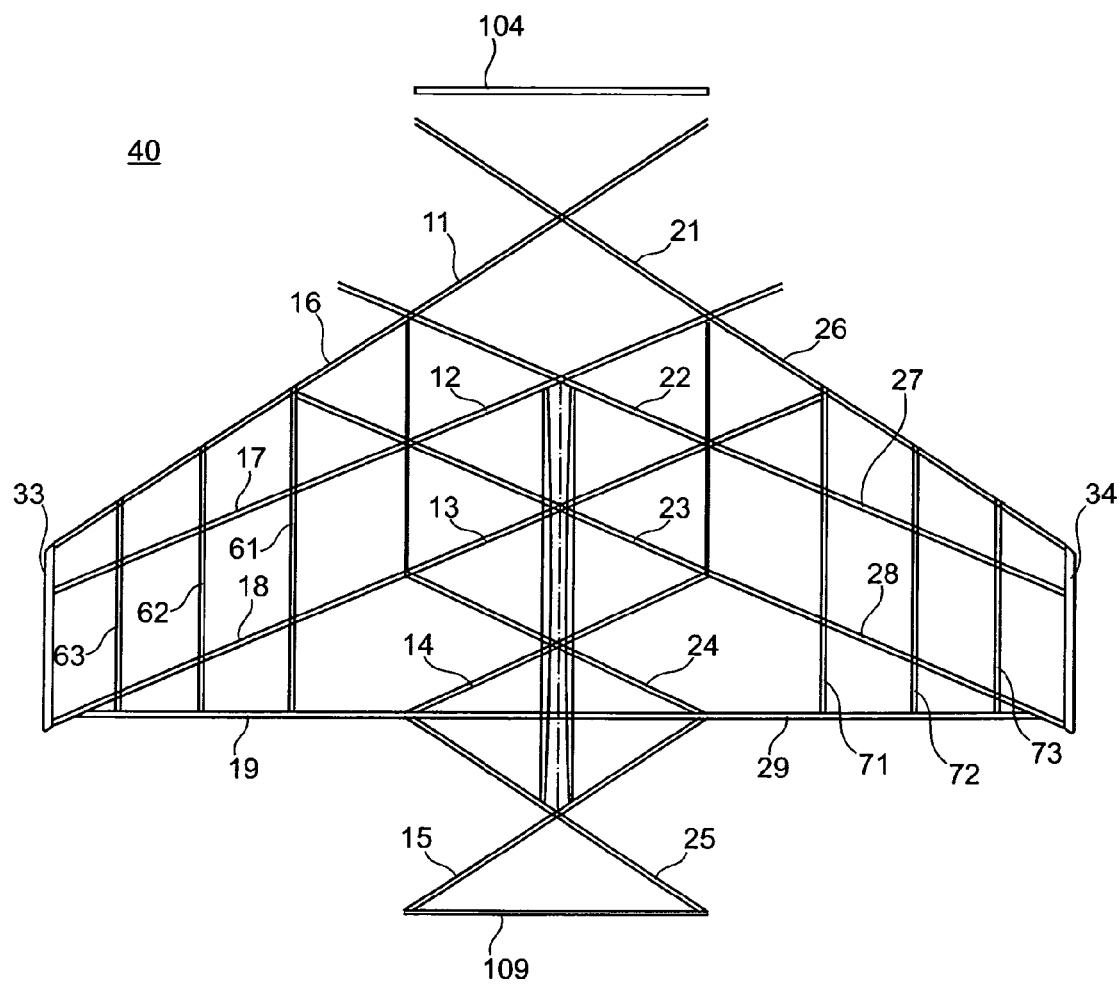
FIG. 7 a diagrammatic top view of the inner stiffening structure of the wing-fuselage section according to the exemplary embodiment, shown in FIG. 3, of the invention.

As is shown in the diagrammatic top view of the interior stiffening structure of the integral wing-fuselage section 40 in FIG. 7, in the case of the exemplary embodiment presently described it is provided for the spars 16-19 or 26-29 of the respective wing regions 5, 6 at the wing root 7, 8 to be continued in an integral manner in the fuselage frame elements 11-15 or 21-25 of the fuselage region 3. In other words, as is clearly shown in FIG. 3, on the wing root 7 and 8, the spars 16-19 and 26-29, which extend in the wing plane, form an integral or single-piece transition to the fuselage frame elements 11-15 and 21-25; wherein, in the exemplary embodiment shown, said fuselage frame elements 11-15 and 21-25 extend around the entire circumference of the aircraft fuselage 2 and at the same time form a floor assembly 30 and an intermediate-deck carrier structure 30a of the fuselage region 3 (compare FIGS. 2 and 3).

As is shown in particular in FIGS. 3 and 7, in each case a carrier element 35 and 36 that extends in longitudinal direction of the aircraft is provided at the wing root 7 and 8, wherein the spars 16-18 of one wing region 5, and the spars 26-28 of the other wing region 6, which spars continue in the fuselage frame elements 11-15 and 21-25, extend within the floor assembly 30 in each case to the carrier element 36 and 35 of the respective other side and are connected to said carrier element 36 or 35. In this way the interior stiffening structure of the integral assembly 40 that forms the wing-fuselage section is able to introduce, absorb and distribute all the loads that are experienced in this region, while at the same time being of lightweight construction.

As is further shown in FIG. 7, the spars 16-19 or 26-29 that extend in the direction of the wingspan of the wings or of the wing regions 5, 6 follow the sweep of the wing 1 at an angle to the longitudinal axis of the aircraft, which angle differs from 90°. In the fuselage region 3, where they make a transition to the fuselage frame elements 11-15 or 21-25, or where they form said fuselage frame elements 11-15 or 21-25, they are thus interconnected by intersections as shown in the top view of FIG. 7. As already explained with reference to FIGS. 2 and 3, the fuselage frame elements 11-15 and 21-25 are designed such that they extend over the entire fuselage circumference and at the same time form the floor assembly 30 of the fuselage region 3 and the intermediate-deck carrier structure 30a of the same. Thus each fuselage frame element 11-15, 21-25 per se is provided in the form of an integral unit which comprises said structural components of the floor assembly 30 and of the intermediate-deck carrier structure 30a.

Below, with reference to FIGS. 8 to 11 an explanation is provided as to how the wing-fuselage section according to an exemplary embodiment can be produced in the form of said integral assembly 40.

Figure 9:
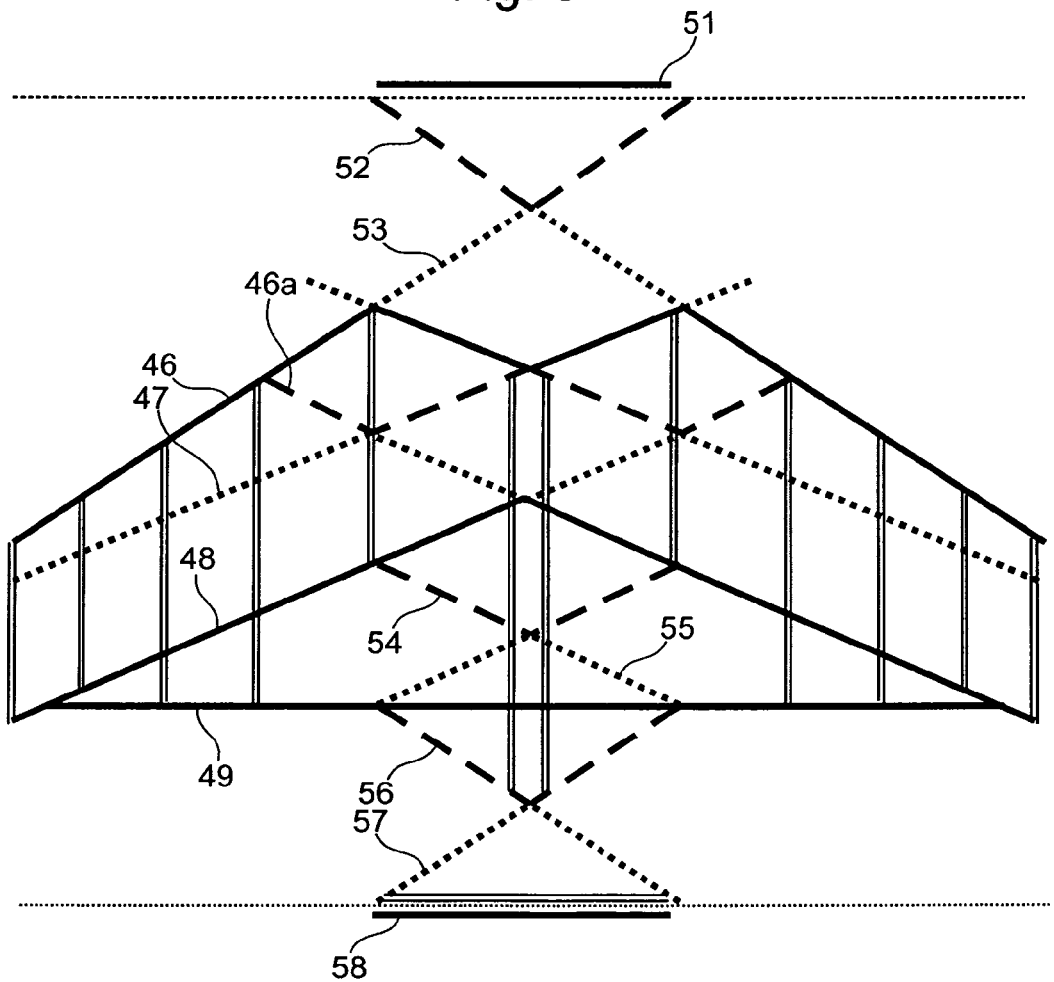

As shown in FIG. 9, the spars 16-19 and 26-29, or the frame elements 11-15 or 21-25 are formed by structural elements 46, 46a, 47, 48, 49 that in the direction of the wingspan continue from one wing region 5 to the other wing region 6, or more precisely expressed from one wing interface 110 to the other wing interface 120, i.e. over the entire extension of the integral wing-fuselage section in its direction of the wingspan. To be able to better distinguish the individual structural elements 46-49, the latter are shown in FIG. 9 in different ways, namely as dashed, dotted or solid lines.

Figure 8:
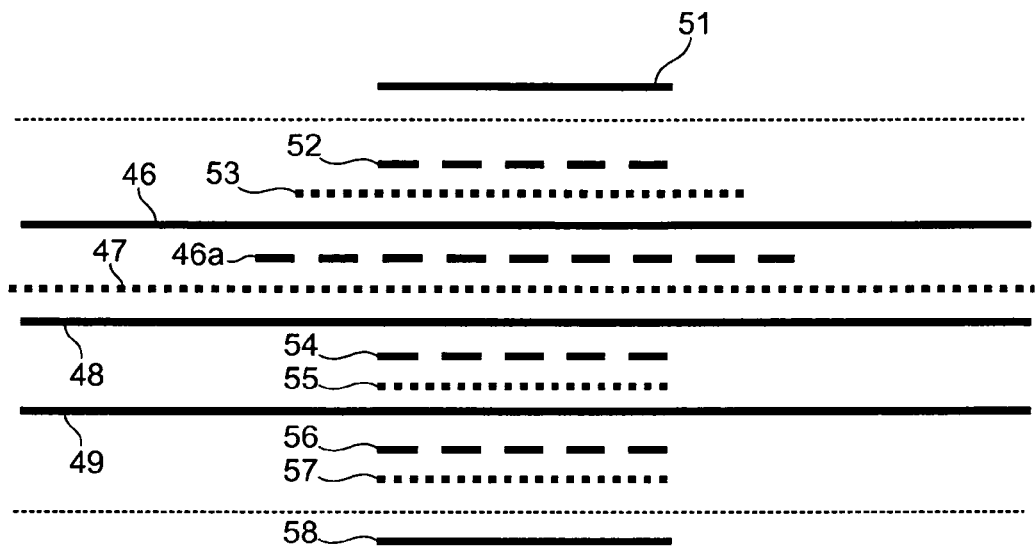
FIGS. 8 to 11 diagrammatic views to explain a production method relating to the wing-fuselage section according to an exemplary embodiment of the invention.

Between two intersections on which the spars or frames 11-15, 16-19, 21-25, 26-29 are interconnected in the fuselage region 3 in the manner described above, said structural elements 46-49 alternately extend at the angle of the respective spar 11, 12, 13, 14, 15 of one side, and at the angle of the respective spar 26, 27, 28, 29 of the respective other side, and at the intersections are connected to the continuous structural elements which in each case form the adjacent or intersecting spars or frame elements which in turn extend between two intersections alternately at the angle of the spar 16-19 of one side, and at the angle of the spar 26-29 of the other side. In FIG. 8 said structural elements 46-49 are shown in the still stretched form.

As is further shown in FIG. 9, in the fuselage region 3 further structural elements 51-58 are provided that form part of the fuselage frame elements 11-15 and 21-25, with the extent of said further structural elements 51-58 being limited to the fuselage region 3. These further structural elements 51-58 are provided in addition to, or as a supplement to, the previously described structural elements 46-49 that continuously extend from one wing region 5 to the other wing region 6.

Figure 10:
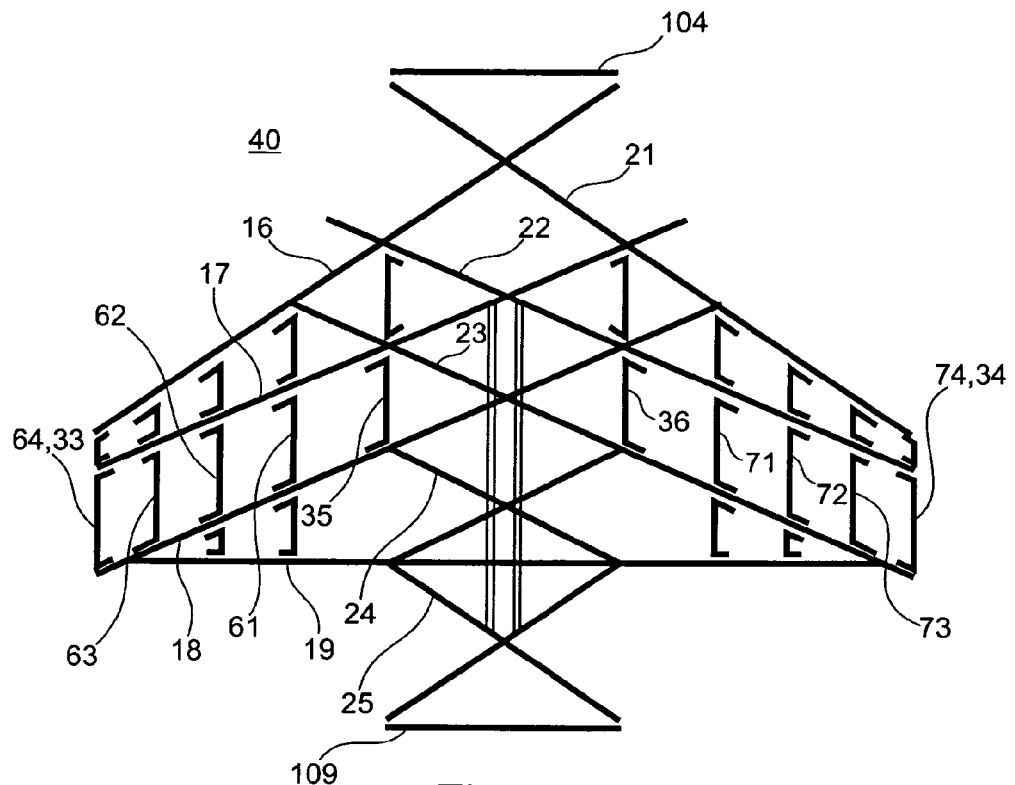

As shown in FIG. 10, the spars 16-19, 26-29 and some of the frame elements 11-15, 21-25 are interconnected by ribs 61-64, 71-74 that essentially extend in longitudinal direction of the aircraft. In the exemplary embodiment shown, the exterior ribs 64, 74 at the same time form the wing connecting elements 33, 34 at the wing interfaces 110, 120.

Figure 12:
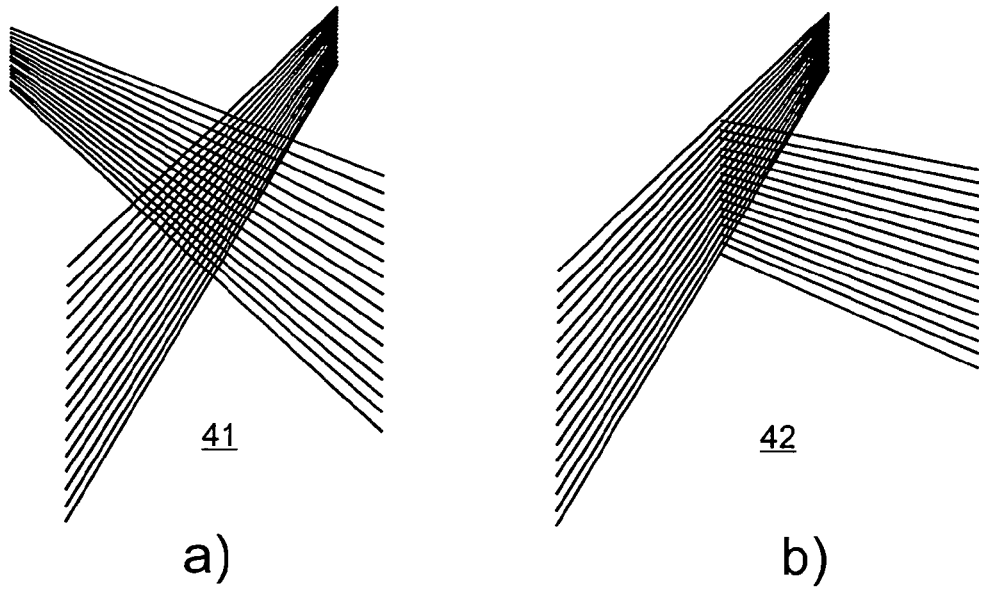
FIGS. 12 a) and b) diagrammatic views of intersection elements or T-piece elements as can be used according to a further exemplary embodiment of the invention for producing the wing-fuselage section.
Figure 13:
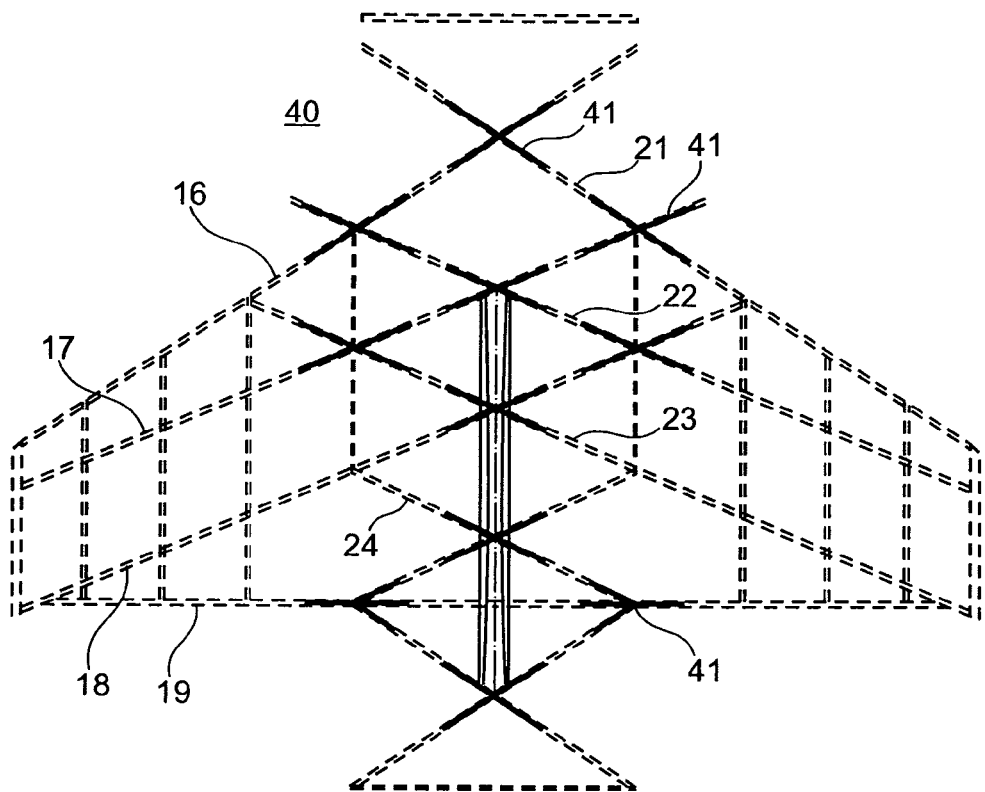
FIG. 13 a diagrammatic view of the arrangement of intersection elements as shown in FIG. 12a), for producing the wing-fuselage section according to the further exemplary embodiment of the invention.
Figure 14:
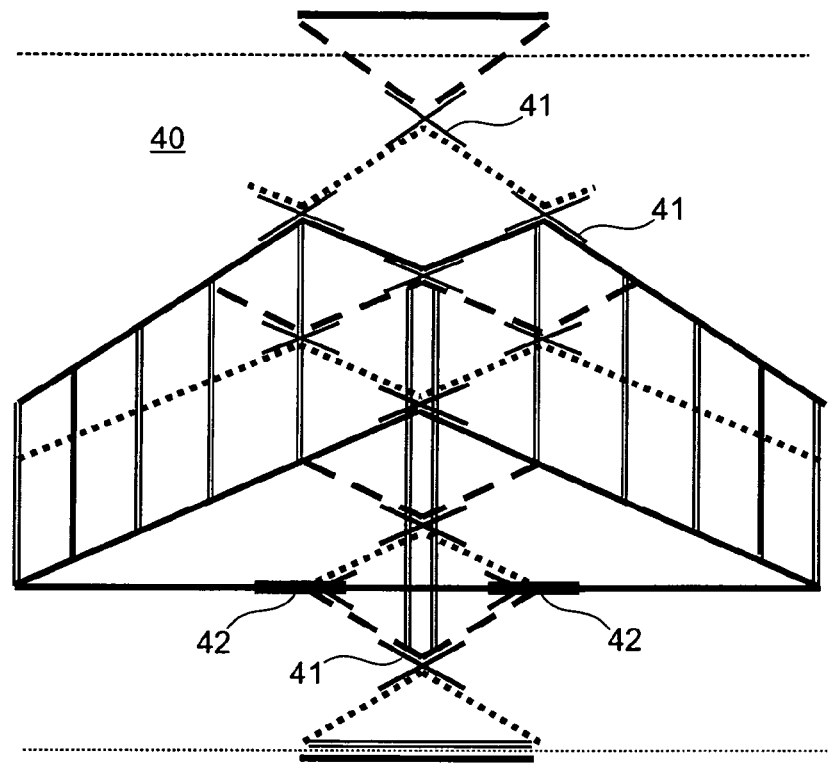
FIGS. 14 and 15 diagrammatic views for explaining the production of a wing-fuselage section according to the further exemplary embodiment of the invention with the use of intersection elements and T-piece elements as shown in FIGS. 12 and 13.
Figure 15:
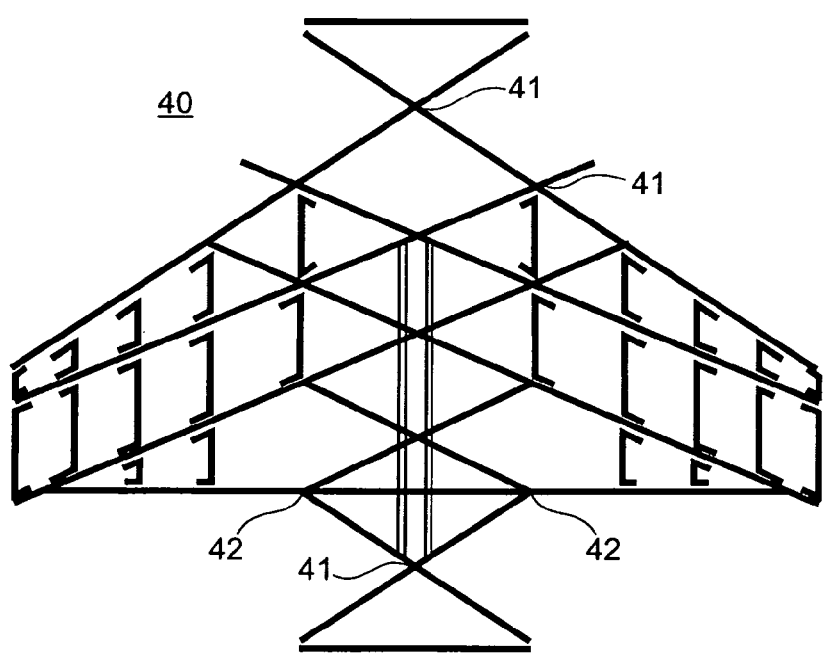

The structural elements 46-49, 51-58 can be interconnected by additional intersection elements 41 or T-piece elements 42, or they can be reinforced by said elements, as is shown in FIGS. 14 and 15. Such intersection- and T-piece elements 41 and 42 are shown individually in FIGS. 12(*a*) and (*b*), while FIG. 13 shows the position of their arrangement.

The integral assembly 40 that forms the wing-fuselage section can be a metal construction, a fibre-reinforced plastic construction (GFRP, CFRP) or a composite construction. In the last mentioned case, for example the interior stiffening structure shown in FIG. 3 can be a fibre-reinforced plastic construction, while the wing skin 80 and the fuselage skin 90 can be made as a metal construction or as a composite construction combining metal- and fibre-reinforced plastics, which construction being placed onto the interior stiffening structure.

Figure 11:
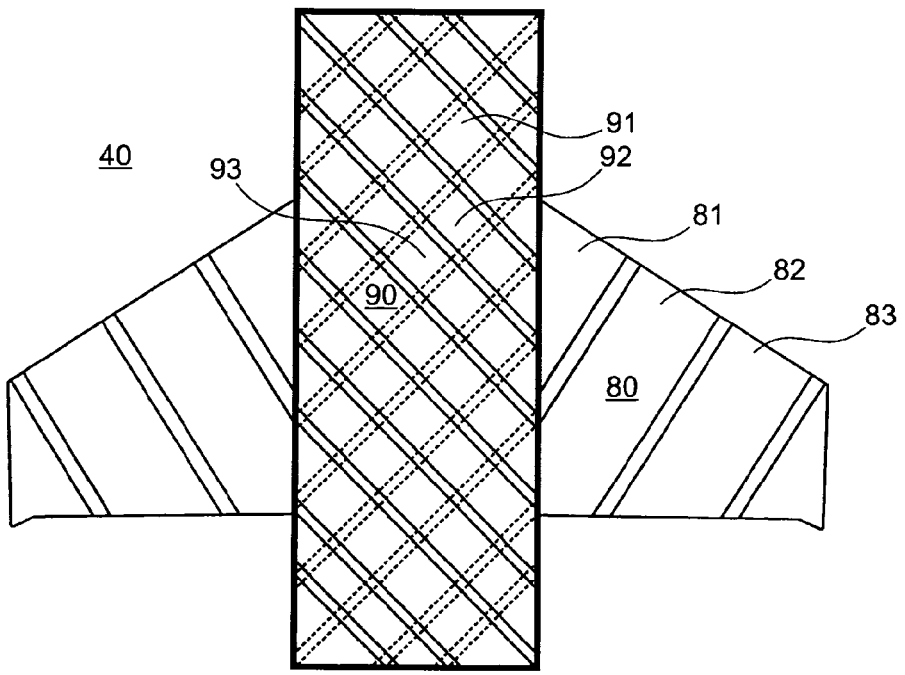

The wing skin 80 and the fuselage skin 90 comprise parallel panels or widths, as shown as an example with reference to the panels 81-83 and 91-93 in FIG. 11.

In fibre-reinforced plastic constructions the structural elements 46-49 and 51-58 that form the spars 16-19, 26-29 and the fuselage frame elements 11-15 and 21-25 can be provided in the form of fibre fabrics or woven fibre fabrics. These fabrics can be sewn together at the intersections and/or reinforced by the intersection elements 41 and T-piece elements 42.

Figure 16:
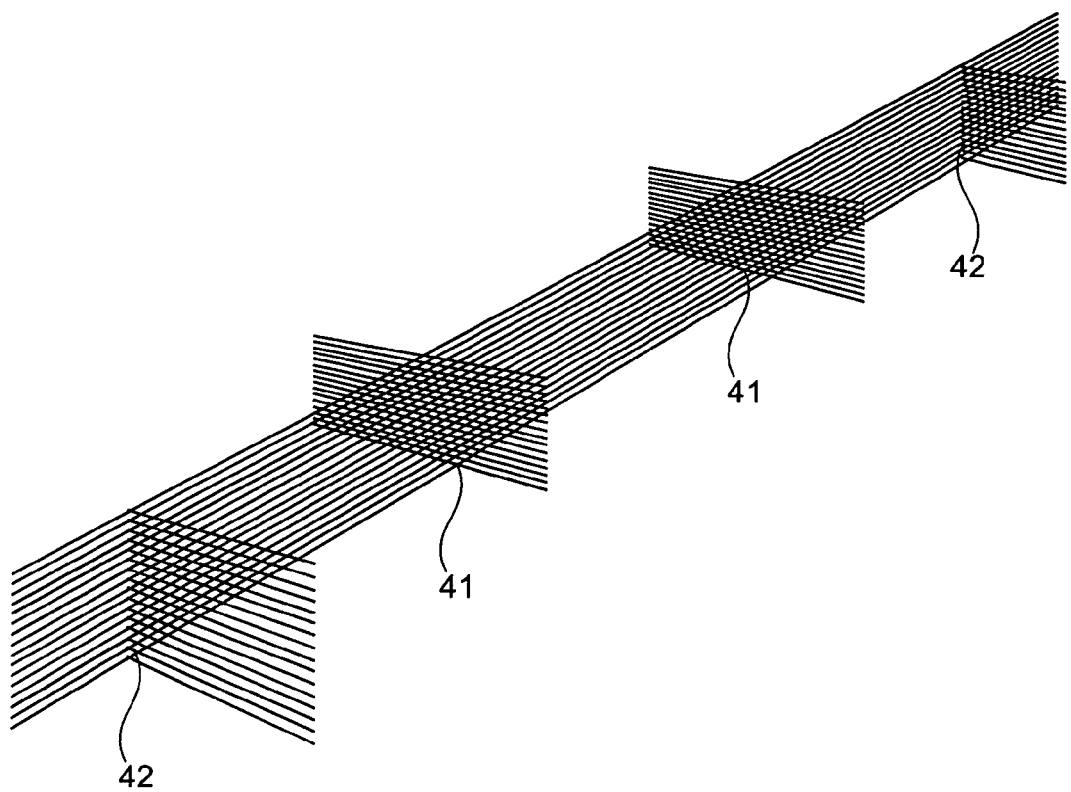
FIG. 16 a diagrammatic view of a structural element comprising intersection elements and T-piece elements as can be produced according to an exemplary embodiment of the invention in an integrated form by means of textile fibre materials.

As shown in FIGS. 12a) and b) the structural elements 46-49, 51-58 or the above-mentioned intersection elements 41 or T-piece elements 42 can be made of woven fibre fabrics that are woven together in a corresponding manner. FIG. 16 shows several such intersection elements 41 or T-piece elements 42 woven into a structural element, such as one of the structural elements 46-49, 51-58.

After the wing skin 80 and fuselage skin 90 have been applied, the wing-fuselage section, which is a fibre-reinforced plastic construction, is finished by curing in an autoclave process.

Figure 4:
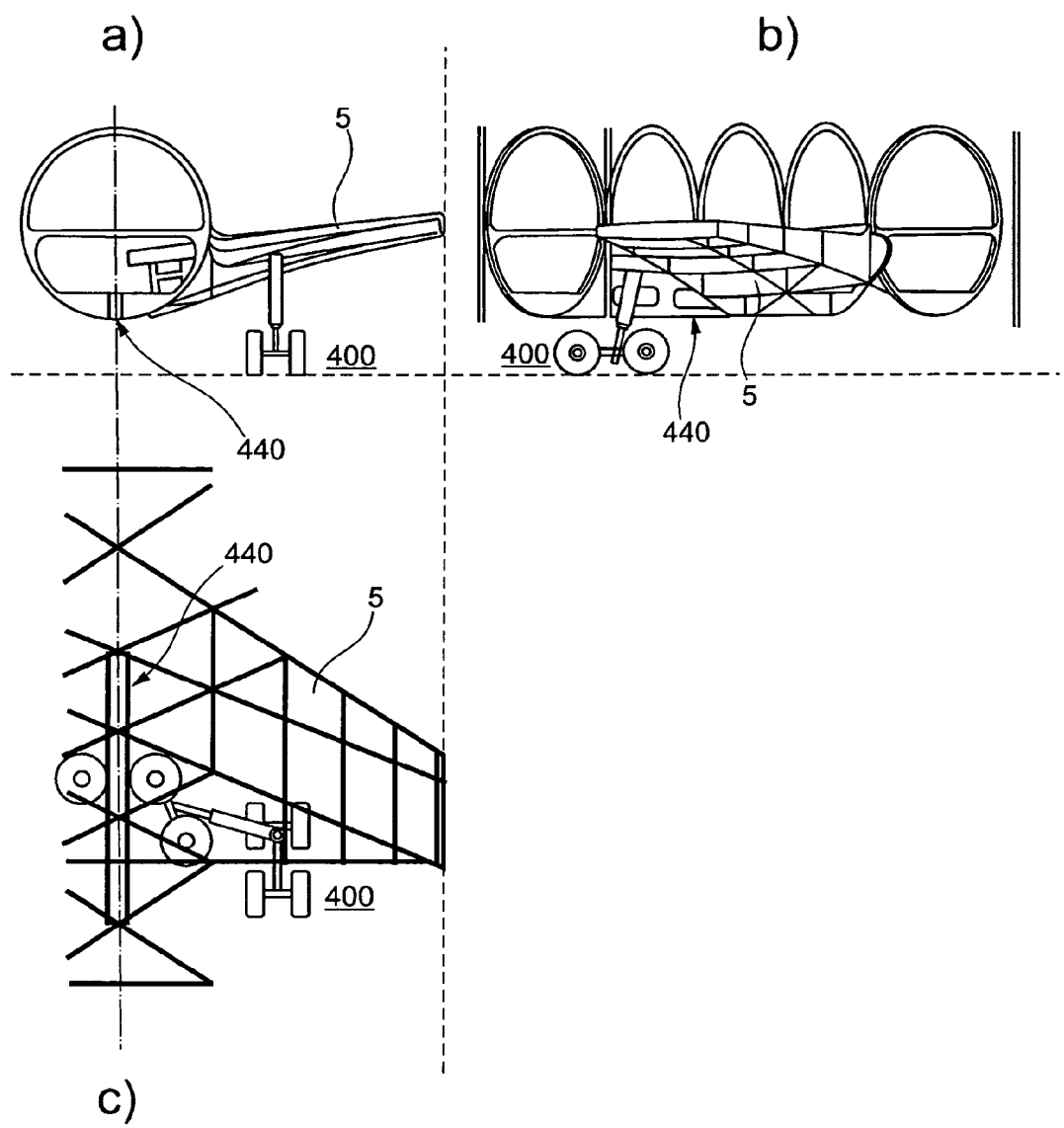
FIGS. 4a) to c) in isometric illustrations a front view, a side view and a top view of the inner stiffening structure, shown in FIG. 3, of the wing-fuselage section with a diagrammatic view of a main landing gear and its connection to and accommodation in the wing-fuselage section according to an exemplary embodiment of the invention.
Figure 5:
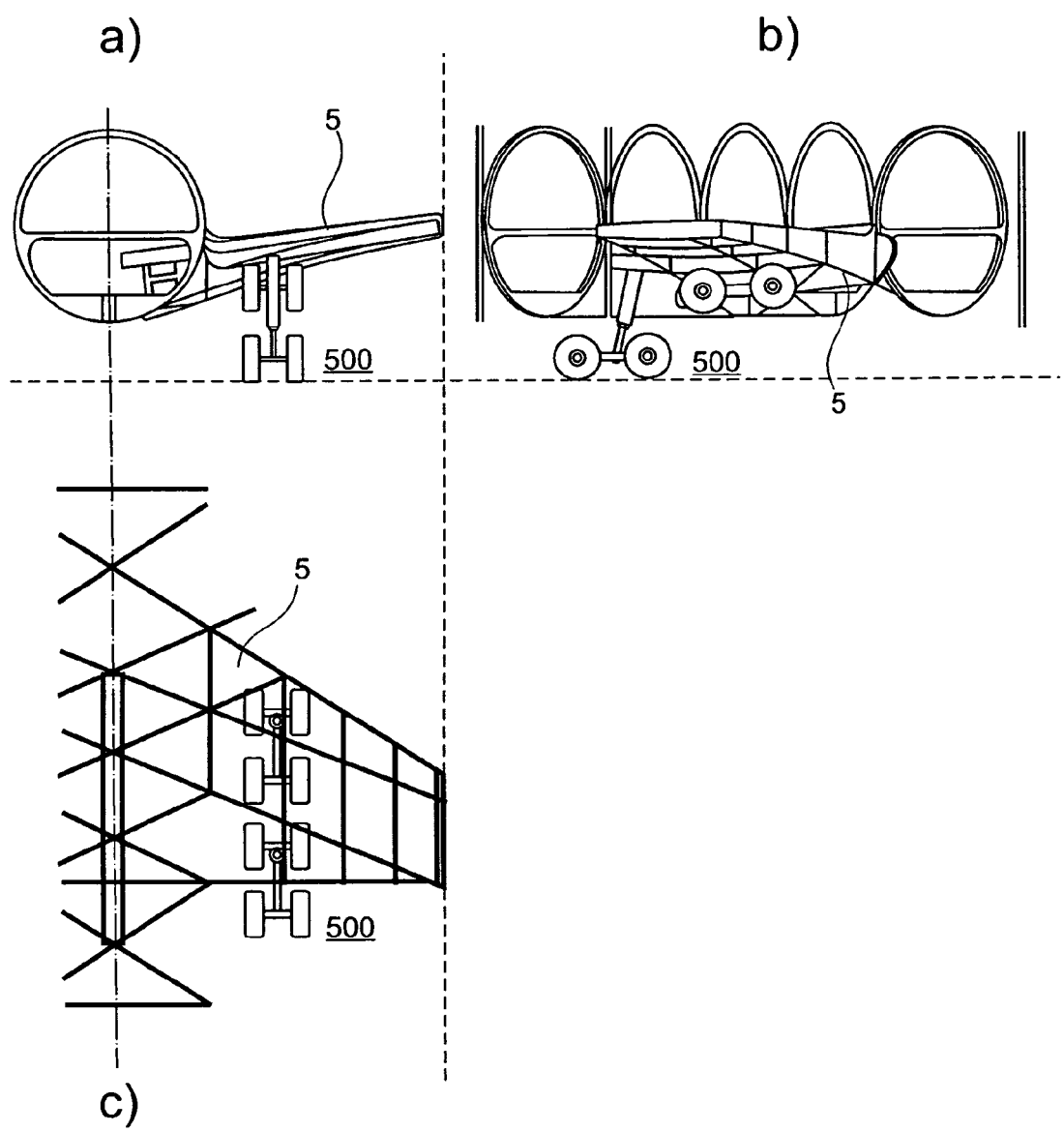
FIGS. 5a) to c) in isometric illustrations a front view, a side view and a top view of the inner stiffening structure, shown in FIG. 3, of the wing-fuselage section with a diagrammatic view of a main landing gear and its connection to and accommodation in the wing-fuselage section according to a further exemplary embodiment of the invention.
Figure 6:
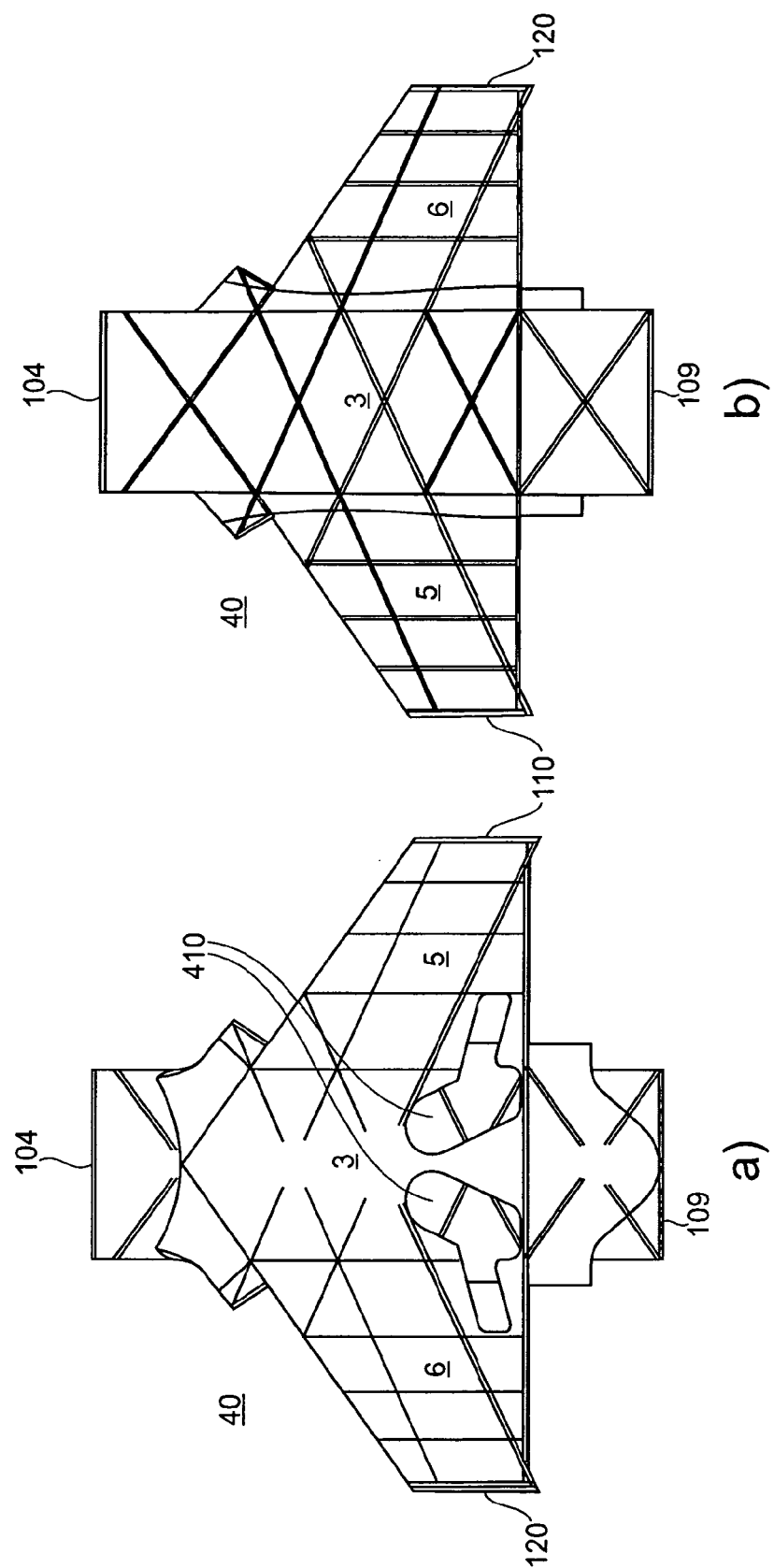
FIGS. 6a) and b) a bottom view and a top view of the wing-fuselage section of FIG. 2.

FIGS. 4 and 5 show two exemplary embodiments of the manner in which a main landing gear can be connected to the wing-fuselage section 40 and can be accommodated therein. The exemplary embodiment shown in the isometric views of FIGS. 4a) to c) provides for the main landing gear 400 to be retracted into the fuselage region 3 in a conventional manner. For this purpose a fuselage section 410 is provided that forms a landing gear bay which accommodates the landing gear in its retracted state. It comprises a keel beam 440 that transfers the forces in longitudinal direction of the fuselage in the region of the fuselage sections.

The alternative exemplary embodiment shown in FIGS. 5a) to c) provides for the landing gear 500 to be hinged forward underneath the wing region 5, 6. In this way the structural design of the fuselage 2 can take place in an optimal manner because its structure is not interrupted by a landing gear bay, and there is thus also no need to provide a keel beam. In this concept it is possible to realise a continuous cargo compartment also in the region of the landing gear 500. In this arrangement a fairing (not shown in FIG. 5) that accommodates the landing gear 500 in its retracted state is to be provided.

LIST OF REFERENCE CHARACTERS

1 Wing
2 Fuselage
3 Fuselage region
4 Front fuselage section
5 Wing region
6 Wing region
7 Wing root
8 Wing root
9 Rear fuselage section
10 Outboard wing
11 Fuselage frame element
12 Fuselage frame element
13 Fuselage frame element
14 Fuselage frame element
15 Fuselage frame element
16 Spar
17 Spar
18 Spar
19 Spar
20 Outboard wing
21 Fuselage frame element
22 Fuselage frame element
23 Fuselage frame element
24 Fuselage frame element
25 Fuselage frame element
26 Spar
27 Spar
28 Spar
29 Spar
30 Floor assembly
30a Intermediate-deck carrier structure
31 Engine
32 Engine
33 Wing connecting element
34 Wing connecting element
35 Carrier element
36 Carrier element
37 Pylon
38 Pylon
39 Engine bracket
40 Integral assembly
41 Intersection element
42 T-piece element
46 Continuous structural element
46a Continuous structural element
47 Continuous structural element
48 Continuous structural element
49 Continuous structural element
50 Further structural element
51 Further structural element
52 Further structural element
53 Further structural element
54 Further structural element
55 Further structural element
56 Further structural element
57 Further structural element
61 Ribs
62 Ribs
63 Ribs
64 Ribs
71 Ribs
72 Ribs
73 Ribs
74 Ribs
80 Wing skin
81 Skin panel
82 Skin panel
83 Skin panel
90 Fuselage skin
91 Skin panel
92 Skin panel
93 Skin panel
104 Front interface
109 Rear interface
110 Wing interface 120 Joining regions
131 Joining regions
132 Joining regions
400 Landing gear
410 Fuselage section
440 Keel beam
500 Landing gear

The invention claimed is:

1. A wing-fuselage section of an aircraft, said wing-fuselage section comprising:
    a wing root at which a wing of the aircraft is connected to a fuselage;
    a fuselage region comprising a plurality of fuselage frame elements extending across a longitudinal direction of the aircraft; and
    a wing region comprising a plurality of spars that extend in a direction of the wingspan,
    wherein the spars of the wing region at the wing root continue as a single piece transition in an integral manner in the fuselage frame elements of the fuselage region forming part of an integral assembly that extends at least over a middle part of the wing and the fuselage region, including the wing root, and wherein the spars that extend in the direction of the wingspan of the wing region generally follow a sweep of the wing extending at a non-perpendicular angle to the longitudinal direction of the aircraft, and
    wherein at least one of the fuselage frame elements intersect with at least one other fuselage frame element in the fuselage region.

2. The wing-fuselage section of claim 1, wherein the integral assembly extends in the longitudinal direction of the aircraft from a front interface that is provided for connecting a front fuselage section to a rear interface that is provided for connecting a rear fuselage section.

3. The wing-fuselage section of claim 1, wherein the integral assembly extends in the direction of the wingspan and comprises at least one interface for connecting an outboard wing to the wing-fuselage section.

4. The wing-fuselage section of claim 1, wherein the integral assembly in the wing region comprises at least one joining region for connecting at least one engine.

5. The wing-fuselage section of claim 4, wherein the joining region for connecting the at least one engine and the interface for connecting the outboard wing are formed by a shared wing connecting element that delimits the integral assembly in the direction of the wingspan.

6. The wing-fuselage structure of claim 1, further comprising at least one carrier element that extends in the longitudinal direction of the aircraft is provided at the wing root, and wherein the spars of the wing region, which spars continue in the fuselage frame elements, on one side extend to the carrier element or on the other side and are connected to said carrier element.

7. The wing-fuselage section of claim 1, wherein the fuselage frame elements form a floor assembly of the fuselage region.

8. The wing-fuselage section of claim 1, wherein the fuselage frame elements form an intermediate-deck carrier structure.

9. The wing-fuselage section of claim 1, wherein the fuselage region defines a circumference, and wherein the fuselage frame elements are configured such that they extend over the entire fuselage circumference.

10. The wing-fuselage section of claim 7, wherein the fuselage frame elements form a unit that integrally comprises the floor assembly and an intermediate-deck carrier structure.

11. The wing-fuselage section of claim 1, wherein the spars or frame elements are formed by a first plurality of continuous structural elements extending in the direction of the wingspan from a first wing region to a second wing region, which structural elements extend between two intersections alternately at the angle of the spar of one side, and at the angle of the spar of the other side, and at the intersections are connected to the continuous structural elements which in each case form the adjacent spars or frame elements which in turn extend between two intersections alternately at the angle of the spar of one side, and at the angle of the spar of the other side, respectively.

12. The wing-fuselage section of claim 11 further comprising in the fuselage region a second plurality of structural elements that supplement the first plurality of structural elements and form part of the fuselage frame elements and that in their extent are limited to the fuselage region.

13. The wing-fuselage section of claim 11, wherein the structural elements are interconnected by a plurality of intersection elements or T-piece elements.

14. The wing-fuselage section of claim 1, wherein at least one of adjacent spars and frame elements are interconnected by ribs that extend in the longitudinal direction of the aircraft.

15. The wing-fuselage section of claim 1, wherein on the spars and frame elements or ribs an outer skin is arranged which, firmly connected to the aforesaid, forms part of the integral assembly.

16. The wing-fuselage section of claim 1, wherein the wing-fuselage section is a metal construction.

17. The wing-fuselage section of claim 1, wherein the wing-fuselage section is a fibre-reinforced plastic construction.

18. The wing-fuselage section of claim 1, wherein the wing-fuselage section is a composite construction.

19. The wing-fuselage section of claim 15, wherein the structural elements comprise fibre fabrics or woven fibre fabrics sewn together at the intersections.

20. The wing-fuselage section of claim 19, wherein the structural elements are reinforced at the intersections by a plurality of intersection elements or T-piece elements.

21. The wing-fuselage section of claim 15, wherein the structural elements comprise fibre fabrics or woven fibre fabrics woven together at the intersections.

22. The wing-fuselage section of claim 21, wherein the structural elements are reinforced at the intersections by a plurality of intersection elements or T-piece elements.

* * * * *

UNITED STATES PATENT AND TRADEMARK OFFICE
CERTIFICATE OF CORRECTION

| | |
|---|---|
| PATENT NO. | : 8,322,656 B2 |
| APPLICATION NO. | : 12/597250 |
| DATED | : December 4, 2012 |
| INVENTOR(S) | : Günter Pahl |

It is certified that error appears in the above-identified patent and that said Letters Patent is hereby corrected as shown below:

In the Claims

Column 7, line 54, Claim 6, after "element" delete "or".

Signed and Sealed this
First Day of September, 2015

Michelle K. Lee
*Director of the United States Patent and Trademark Office*